(12) United States Patent
Nakai

(10) Patent No.: US 7,903,354 B2
(45) Date of Patent: Mar. 8, 2011

(54) OPTICAL SCANNING DEVICE AND IMAGE FORMING APPARATUS HAVING THE SAME

(75) Inventor: Jun Nakai, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 119 days.

(21) Appl. No.: 11/976,754

(22) Filed: Oct. 26, 2007

(65) Prior Publication Data
US 2008/0100920 A1    May 1, 2008

(30) Foreign Application Priority Data
Oct. 30, 2006  (JP) .................. 2006-293693

(51) Int. Cl.
G02B 7/02 (2006.01)
(52) U.S. Cl. .......... 359/819; 359/798; 359/800; 359/811
(58) Field of Classification Search .............. 359/819
See application file for complete search history.

(56) References Cited

U.S. PATENT DOCUMENTS

| 4,918,702 | A | * | 4/1990 | Kimura ................... 372/34 |
| 5,701,191 | A | * | 12/1997 | Iwasaki ................. 359/205.1 |
| 5,805,363 | A | * | 9/1998 | Okuda et al. .............. 359/819 |
| 2004/0240205 | A1 | * | 12/2004 | Hayakawa et al. ........... 362/257 |
| 2005/0169152 | A1 | * | 8/2005 | Miyake et al. ........... 369/112.15 |

FOREIGN PATENT DOCUMENTS

| JP | 8-112940 | 5/1996 |
| JP | 2001-71553 | 3/2001 |

* cited by examiner

*Primary Examiner* — Jessica T Stultz
(74) *Attorney, Agent, or Firm* — Smith, Gambrell & Russell, LLP

(57) ABSTRACT

Provided is an optical scanning device that can consistently obtain a light beam having a desired beam spot diameter without allowing an aperture to block parallel ray to be admitted, and that can be manufactured at lower cost. The optical scanning device has a light source that emits laser light, a collimator lens that converts the laser light emitted from the light source into parallel ray, and a lens holder that holds the collimator lens and has an aperture portion for fairing the laser light, the aperture portion being formed integrally with the lens holder. The optical scanning device also may have a collimator lens having a lens surface with which an aperture portion for fairing the laser light is brought into close contact.

4 Claims, 4 Drawing Sheets

--Prior Art--

US 7,903,354 B2

OPTICAL SCANNING DEVICE AND IMAGE FORMING APPARATUS HAVING THE SAME

This application is based on Japanese Patent Application No. 2006-293693 filed on Oct. 30, 2006, the contents of which are hereby incorporated by reference.

BACKGROUND OF THE INVENTION

1. Field of the Invention

The present invention relates to an optical scanning device used as an optical system for writing in an image forming apparatus such as a printer, a facsimile, a copier, and the like and relates to an image forming apparatus having the same.

2. Description of Related Art

In recent years, there have been developed optical scanning devices using a laser beam as a light source, such as multi-beam optical scanning devices that write a plurality of lines simultaneously by using a plurality of laser beams. In particular, since a semiconductor laser (a laser diode) is easily controlled to turn ON/OFF and is compact in size, optical scanning devices using such a semiconductor laser as a light source have come to be developed increasingly eagerly.

In such an optical scanning device, a light beam emitted from a light source such as a semiconductor laser is deflected by deflecting means such as a polygon mirror, and is then made to scan across a photoconductor. In this way, an electrostatic latent image is formed. Additionally, in such an optical scanning device, in general, diffused light emitted from the light source is converted into parallel ray by means of a collimator lens, and the parallel ray thus obtained is faired by an aperture stop (hereinafter referred to as an "aperture") to obtain a light beam having a desired beam spot diameter.

Here, it is known that the aperture for fairing the parallel ray is best located in an image-side focal position of a collimator lens. This is because it is thereby possible to prevent parallel ray to be admitted from being blocked by the aperture even when an optical axis of the collimator lens is deviated from that of the light source. As shown in FIG. 6, in a conventional optical scanning device, a collimator lens 100, a lens holder 101, and an aperture 102 are provided separately, and assembled into a single unit in such a way that the aperture 102 is disposed in an image-side focal position of the collimator lens 100 (see, for example, JP-A-2001-071553).

However, to dispose the aperture 102 in the image-side focal position of the collimator lens 100, as in the optical scanning device disclosed in JP-A-2001-071553, it is necessary to form both the lens holder 101 and the aperture 102 so as to have part longer than the image-side focal distance in the optical axis direction, or form one of the lens holder 101 and the aperture 102 so as to have part longer than the image-side focal distance in the optical axis direction, as shown in FIG. 6. There is a problem that this disadvantageously increases a manufacturing cost of the lens holder 101 or the aperture 102.

Moreover, with this structure, the collimator lens 100, the lens holder 101, and the aperture 102 are provided separately, and assembled into a single unit in such a way that the aperture 102 is disposed in the image-side focal position of the collimator lens 100. As a result, when an out-of-tolerance error or the like occurs, the following problem arises. The aperture 102 is shifted from the image-side focal position of the collimator lens 100, whereby parallel ray to be admitted is blocked by the aperture. This makes it impossible to obtain a light beam having a desired beam spot diameter.

SUMMARY OF THE INVENTION

In view of the above described problems, it is a first object of the present invention to provide optical scanning devices that can consistently obtain a light beam having a desired beam spot diameter without allowing an aperture to block parallel ray to be admitted, and that can be manufactured at lower cost. It is a second object of the present invention to provide image forming apparatuses having such optical scanning devices.

To achieve the first object described above, according to a first aspect of the present invention, an optical scanning device is provided with: a light source that emits laser light; a collimator lens that converts the laser light emitted from the light source into parallel ray; and a lens holder that holds the collimator lens and has an aperture portion for fairing the laser light, the aperture portion being formed integrally with the lens holder.

Further, to achieve the first object described above, according to a second aspect of the present invention, an optical scanning device is provided with: a light source that emits laser light; a collimator lens that converts the laser light emitted from the light source into parallel ray; an aperture member that fairs the laser light, the aperture member being in close contact with a surface of the collimator lens in such a way as to follow the shape thereof; and a lens holder that holds the collimator lens.

According to a third aspect of the present invention, in the optical scanning device according to the second aspect, the aperture member may be brought into close contact with a laser-light-exit-side lens surface of the collimator lens.

According to a fourth aspect of the present invention, in the optical scanning device according to the second aspect, the aperture member may be elastically deformable.

According to a fifth aspect of the present invention, an optical scanning device is provided with: a light source that emits laser light; a collimator lens that converts the laser light emitted from the light source into parallel ray; and a lens holder that holds the collimator lens, the lens holder being formed with an aperture portion and a lens barrel portion integrated together, the aperture portion fairing the laser light and being in close contact with a laser-light-exit-side lens surface of the collimator lens in such a way as to follow a shape thereof, the lens barrel portion holding the collimator lens.

According to a sixth aspect of the present invention, in the optical scanning device according to the fifth aspect, the aperture portion may be elastically deformable, and the aperture portion may be elastically deformed in such a way as to follow the shape of a lens surface of the collimator lens.

To achieve the second object described above, according to a seventh aspect of the present invention, an image forming apparatus is provided with an optical scanning device including: a light source that emits laser light; a collimator lens that converts the laser light emitted from the light source into parallel ray; and a lens holder that holds the collimator lens and has an aperture portion for fairing the laser light, the aperture portion being formed integrally with the lens holder.

To achieve also the second object described above, according to an eighth aspect of the present invention, an image forming apparatus is provided with an optical scanning device including: a light source that emits laser light; a collimator lens that converts the laser light emitted from the light source into parallel ray; an aperture member that fairs the laser light, the aperture member being in close contact with a surface of the collimator lens in such a way as to follow the shape thereof; and a lens holder that holds the collimator lens.

According to the first aspect of the present invention, the lens holder and the aperture portion that fairs the laser light are integrated together. This makes it possible to prevent an out-of-tolerance error or the like from occurring in the aperture portion with respect to the collimator lens when assembling the lens holder and the collimator lens into a single unit. This helps consistently to obtain a light beam having a desired beam spot diameter, and reduce the number of parts and manufacturing steps and hence manufacturing cost.

According to the second aspect of the present invention, the aperture portion that fairs the laser light is brought into close contact with a lens surface. This helps to prevent parallel ray to be admitted from being blocked by the aperture, and eliminate the need to form the lens holder so as to be longer than the image-side focal distance of the collimator lens in the optical axis direction. This makes it possible to reduce the number of members and hence manufacturing cost.

According to the third aspect of the present invention, the aperture portion is brought into close contact with the laser-light-exit-side lens surface, and the parallel ray obtained by converting the laser light is cut. This helps to prevent parallel ray to be admitted from being blocked by the aperture. In addition, as compared with a case when the diffused light entering the collimator lens is cut, it is possible to reduce variations in beam spot diameters.

According to the fourth aspect of the present invention, in the optical scanning device according to the second aspect, the aperture portion is made thin enough to be elastically deformable, such that the aperture portion is elastically deformed in such a way as to follow the shape of the laser-light-exit-side lens surface. This makes it possible to easily bring the aperture portion into close contact with the laser-light-exit-side lens surface. This helps to prevent parallel ray to be admitted from being blocked by the aperture, and provide an optical scanning device that can consistently obtain a light beam having a desired beam spot diameter, and that can be manufactured at lower cost.

According to the seventh aspect, the image forming apparatus is provided with an optical scanning device in which the lens holder and the aperture portion that fairs the laser light are integrated together. This makes it possible to prevent an out-of-tolerance error or the like from occurring in the aperture portion with respect to the collimator lens when assembling the lens holder and the collimator lens into a single unit, and to consistently obtain a light beam having a desired beam spot diameter. This also helps to reduce the number of parts and manufacturing steps, and thus realize an image forming apparatus that can be manufactured at lower cost.

According to the eighth aspect of the present invention, the image forming apparatus is provided with an optical scanning device in which the aperture portion that fairs the laser light is brought into close contact with a lens surface in such a way as to follow the shape thereof. This helps to prevent parallel ray to be admitted from being blocked by the aperture, and eliminate the need to form the lens holder so as to be longer than the image-side focal distance of the collimator lens in the optical axis direction. This makes it possible to realize an image forming apparatus that can be manufactured at lower cost due to a reduction in the number of members.

DETAILED DESCRIPTION OF PREFERRED EMBODIMENTS

Figure 1:
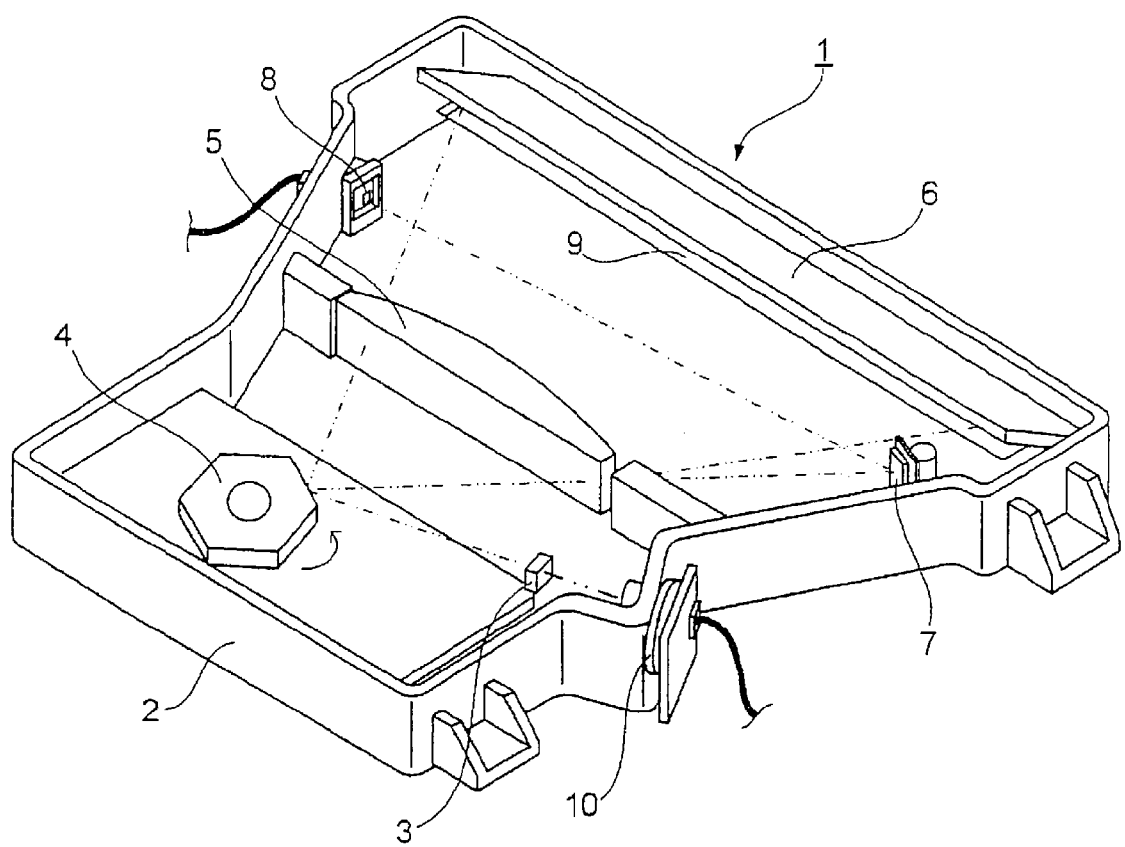
FIG. 1 is a perspective view of an optical scanning device according to the present invention.
Figure 2:
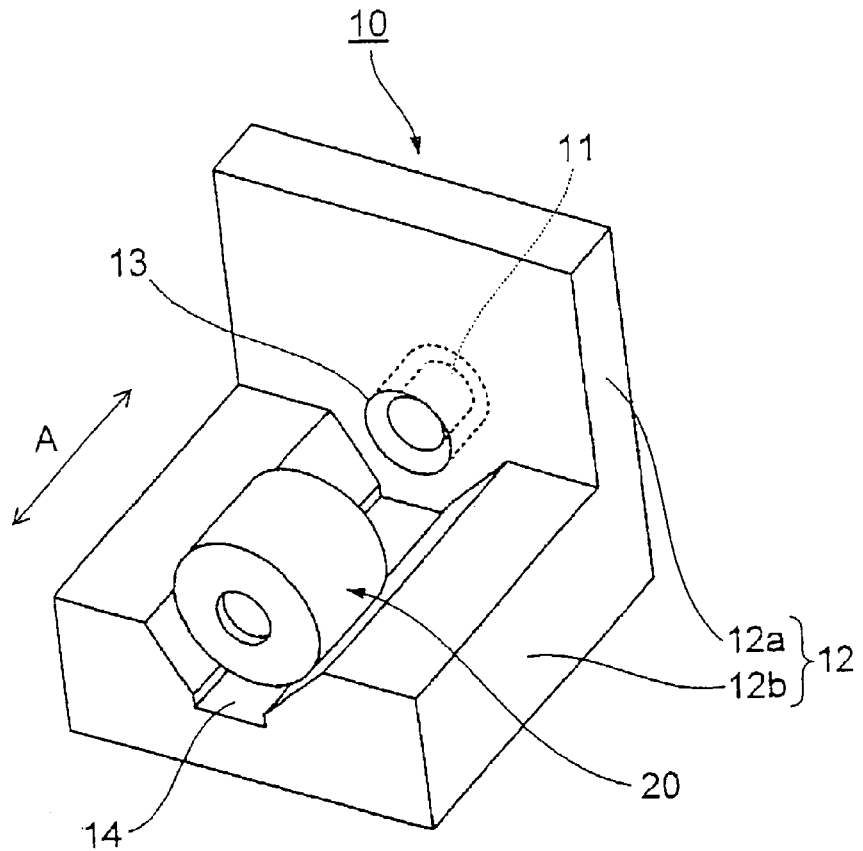
FIG. 2 is a perspective view of a light source block incorporated in the optical scanning device according to the present invention.

Hereinafter, an embodiment of the present invention will be described with reference to the accompanying drawings. First, with reference to FIG. 1 and FIG. 2, the structure and operation of an optical scanning device according to the present invention will be described. FIG. 1 is a perspective view of the optical scanning device according to the present invention, and FIG. 2 is a perspective view of the light source block incorporated in the optical scanning device according to the present invention. For the sake of convenience, a cover member that covers the housing of the optical scanning device is not shown in FIG. 1. Furthermore, an image forming apparatus according to the present invention differs from a commonly-used image forming apparatus only in that it incorporates the optical scanning device described above. In other respects, the image forming apparatus of the invention has the same structure as that of any conventionally known image forming apparatus, and therefore detailed descriptions thereof will be omitted.

As shown in FIG. 1, the optical scanning device 1 includes a light source block 10 provided in the inner side face or inner bottom face of a housing 2, a cylindrical lens 3, a polygon mirror 4 and a driving motor therefore, a scanning lens 5, a reflection mirror 6, a mirror 7, and a beam detection sensor 8. A photoconductor drum (not shown) serving as an image carrier body is provided outside of the housing 2. The housing 2 has, in a bottom face thereof, a window portion 9 through which laser light is guided from the housing 2 to the photoconductor drum.

As shown in FIG. 2, the light source block 10 incorporated in the optical scanning device 1 includes a laser diode (hereinafter referred to as an LD) 11 that emits laser light, a collimator lens unit 20 built with a collimator lens 21 (see FIG. 3) and a lens holder 22 (see FIG. 3), and a base 12 that holds the laser diode 11 and the collimator lens unit 20.

The base 12 is composed of a plate-shaped LD holding portion 12a that holds the LD 11 and a lens holding portion 12b that holds the collimator lens unit 20. The lens holding portion 12b is integrally formed in a shape like the letter L so as to be at a right angle to a lower edge of the LD holding portion 12a. The LD holding portion 12a has a bore 13 formed therein. The LD 11 is inserted in the bore 13 from an opposite side that the lens holding portion 12b is formed.

On a top face of the lens holding portion 12b is provided a substantially V-shaped sliding groove 14 that holds the collimator lens unit 20 in such way that the collimator lens unit 20 can slide along it in a direction (a direction indicated by arrow A in FIG. 2) of an optical axis of the laser light emitted from the LD 11. The sliding groove 14 is so formed that the collimator lens unit 20 is held in a position where the laser light emitted from the LD 11 enters the collimator lens 21. By sliding the collimator lens unit 20 along the sliding groove 14, it is possible to adjust the spacing between the LD 11 and the collimator lens 21.

The collimator lens unit 20 is slid in fine increments in the direction of arrow A by hand or by a conventionally known feed screw mechanism (not shown) or the like to adjust the position of the collimator lens unit 20, such that the laser light emitted from the LD 11 is focused onto a surface of the unillustrated photoconductor drum in a state of a prescribed beam spot in terms of its diameter, focus condition, and the like. Then, the collimator lens unit 20 is securely bonded to the lens holding portion 12b by using a ultraviolet cure adhesive, an instant adhesive, an epoxy adhesive, a commonly-used bond, or the like.

In the optical scanning device 1 structured as described above, the laser light emitted from the LD 11 provided in the light source block 10 and converted into parallel ray by the collimator lens unit 20 is condensed by the cylindrical lens 3 to produce lines of flux light, then, it is deflected and scanned by the polygon mirror 4 in a prescribed scanning direction for scanning, and is then focused onto the surface of the photoconductor drum via the scanning lens 5 and the reflection mirror 6. The focused light beam is made to scan across the photoconductor drum in a main scanning direction by the rotation of the polygon mirror 4 and in a sub-scanning direction by the rotation of the photoconductor drum. In this way, an electrostatic latent image is formed on the surface of the photoconductor drum.

The scanning light beam from the polygon mirror 4 is reflected at one end thereof in the main scanning direction by the mirror 7 so as to be directed downward in a scanning plane, and is then received by the beam detection sensor 8. The received scanning light beam is converted by the beam detection sensor 8 into a scanning start signal, and is then transmitted to the LD 11 provided in the light source block 10. Upon receiving the scanning start signal, the LD 11 starts write modulation.

Figure 3:
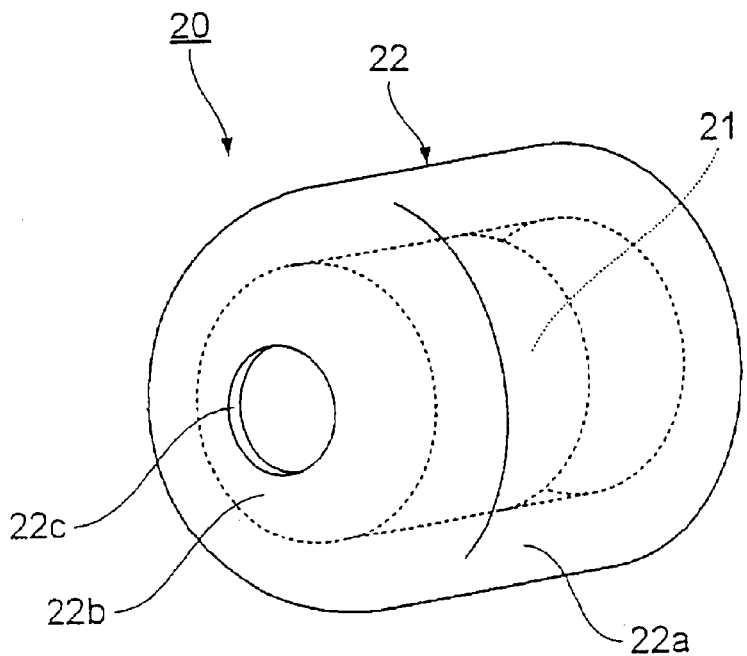
FIG. 3 is a perspective view of a collimator lens unit.
Figure 4:
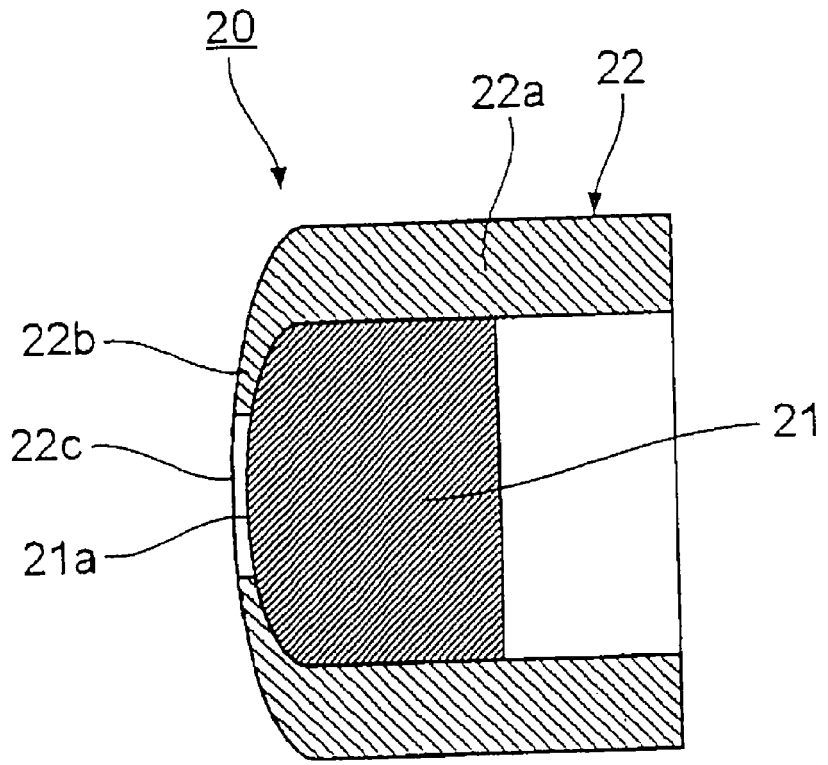
FIG. 4 is a side sectional view of the collimator lens unit.
Figure 5:
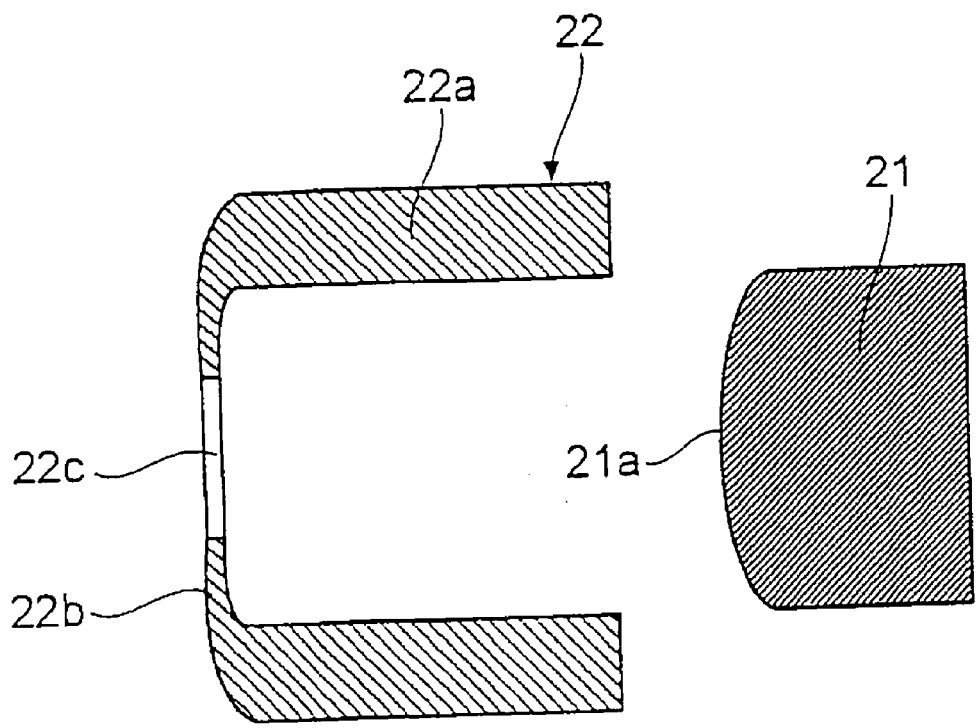
FIG. 5 is side sectional view of a collimator lens and a lens holder that are not yet assembled into a single unit.
Figure 6:
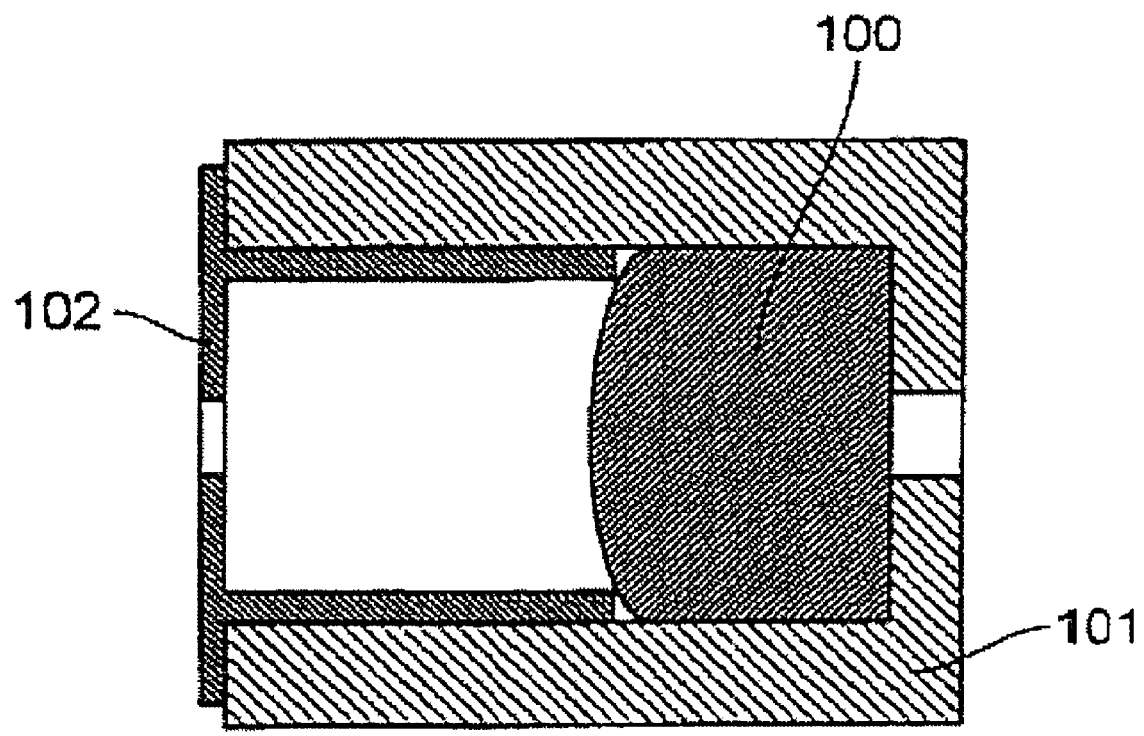
FIG. 6 is a side sectional view of a conventional collimator lens unit.

Next, with reference to FIGS. 3 to FIG. 5, the collimator lens unit 20 used in the light source block 10 incorporated in the optical scanning device 1 of the invention will be described. FIGS. 3 and 4 are a perspective view and a side sectional view, respectively, of the collimator lens unit. FIG. 5 is a side sectional view of the collimator lens and the lens holder that are not yet assembled into a single unit. As shown in FIGS. 3 and FIG. 4, the collimator lens unit 20 is composed of the collimator lens 21 and the lens holder 22.

As shown in FIG. 5, the lens holder 22 is formed so as to have a U-shaped section, and is built with a cylindrical lens barrel portion 22a in which the collimator lens 21 is placed, and an aperture portion 22b formed integrally at one end of the lens barrel portion 22a so as to partially cover the opening at one end. As for a material suitable for the lens holder 22, synthetic resin that is lightweight and heat resistant (for example, an alloy material of ABS resin and PC resin) or the like can be used suitably.

The lens barrel portion 22a is made thick enough to suffer less elastic deformation, so that it can hold the collimator lens 21 with stability. The inner diameter of the lens barrel portion 22a is set to be substantially equal to the outer diameter of the collimator lens 21, such that the collimator lens 21 can be press-fitted into the lens barrel portion 22a. The length of the lens barrel portion 22a in the optical axis direction is set to be longer than that of the collimator lens 21, such that the collimator lens 21 can be accommodated in the lens barrel portion 22a.

The aperture portion 22b is formed integrally at one end of the lens barrel portion 22a. The aperture portion 22b has a circular opening 22c formed at the center thereof at which it faces a lens surface of the collimator lens 21, such that the parallel ray converted by the collimator lens 21 is faired to obtain a light beam having a desired beam spot diameter. The aperture portion 22b is made thin enough to be elastically deformable.

The collimator lens 21 is placed in the lens holder 22 structured as described above as follows. As shown in FIG. 5, the collimator lens 21 is inserted into the lens barrel portion 22a through an opening thereof with a laser-light-exit-side lens surface 21a of the collimator lens 21 facing the aperture portion 22b until the laser-light-exit-side lens surface 21a makes contact with the aperture portion 22b.

After the laser-light-exit-side lens surface 21a makes contact with the aperture portion 22b, the collimator lens 21 is pushed even further into the lens barrel portion 22a. As described above, since the aperture portion 22b is made thin enough to be elastically deformable, the aperture portion 22b is elastically deformed in such a way as to follow the shape of the laser-light-exit-side lens surface 21a. As a result, as shown in FIG. 4, the aperture portion 22b is brought into close contact with the laser-light-exit-side lens surface 21a in such a way as to follow the shape of the laser-light-exit-side lens surface 21a.

As described above, by bringing the aperture portion 22b into close contact with the laser-light-exit-side lens surface 21a, it is possible to prevent an out-of-tolerance error or the like from occurring in the aperture portion 22b with respect to the collimator lens 21 when assembling relevant components into a single unit. This makes it possible to consistently obtain a light beam having a desired beam spot diameter. Moreover, since the aperture portion 22b is brought into close contact with the laser-light-exit-side lens surface 21a, the lens holder 22 need not be formed so as to be longer than the image-side focal distance of the collimator lens 21 in the optical axis direction. It becomes possible to intend reduction of manufacturing cost by decrease of the number of members.

The embodiment described above deals with a structure in which the aperture portion 22b is made thin enough to be elastically deformable, such that the aperture portion 22b is elastically deformed in such a way as to follow the shape of the laser-light-exit-side lens surface 21a and to be brought into close contact with the laser-light-exit-side lens surface 21a. Alternatively, a surface of the aperture portion 22b that faces the collimator lens 21 may be formed to have the same shape as the laser-light-exit-side lens surface 21a. Moreover, although the shape of the opening formed in the aperture portion 22b is circular in FIG. 3, the shape of the opening is not limited to that specifically shown in the figure. For example, the opening formed in the aperture portion 22b may have a quadrangular shape, an oval shape, a polygonal shape, or any other shape that combines these shapes.

Further, the embodiment described above deals with a structure in which the aperture portion 22b is brought into close contact with the laser-light-exit-side lens surface 21a. Alternatively, the aperture portion 22b may be brought into close contact with a laser-light-entrance-side lens surface. However, as compared with a case when the diffused light entering the collimator lens 21 is cut to shape the laser light, when the parallel ray obtained as a result of conversion by the collimator lens 21 is cut to shape the laser light, it is possible to reduce variations in beam spot diameters thus obtained. It is for this reason that the aperture portion 22b is preferably brought into close contact with the laser-light-exit-side lens surface 21a.

Moreover, the embodiment described above deals with a structure in which the lens barrel portion 22a that holds the collimator lens 21 and the aperture portion 22b that fairs the laser light are integrated together into the lens holder 22, and the collimator lens 21 separately provided is placed in the lens holder 22. Alternatively, the collimator lens 21 and the lens holder 22 may be integrated together by using coinjection molding.

Further, the embodiment described above deals with a structure in which the aperture portion 22b that fairs the laser light and the lens holder 22 are integrated together, and the collimator lens 21 is brought into close contact with the aperture portion. Alternatively, since a structure in which an aperture portion and a lens holder are integrated together and a structure in which a collimator lens is brought into close contact with the aperture portion are independent each other, it is also possible to form the aperture portion as an aperture member which is a different body from the lens holder.

The present invention may be practiced in any other manner than specifically described above, with any modification or variation made within the spirit of the invention. For example, the embodiment described above deals with an optical scanning device that writes a line by utilizing one LD; however it is also possible to adopt the present invention to a multi-beam optical scanning device.

The present invention can be applied to optical scanning devices used as an optical systems for writing in image forming apparatuses such as printers, facsimiles, and copiers, and to image forming apparatuses having such optical scanning devices.

What is claimed is:

1. An optical scanning device comprising:
   a light source that emits laser light;
   a collimator lens having a curved surface and converting laser light emitted from the light source into parallel rays; and
   an aperture member, that fairs the laser light, formed of an elastically deformable material and having a cylindrical barrel portion and an aperture portion integrally formed at one end of the barrel portion, the aperture portion being relatively thin to be deformable to follow the curved surface of the collimator lens when pressed into contact with the lens, and the barrel portion being relatively thicker and less deformable than the aperture portion so that the barrel portion holds the collimator lens.

2. The optical scanning device according to claim 1, wherein the aperture member is brought into close contact with a laser-light-exit-side lens surface of the collimator lens.

3. An optical scanning device comprising:
   a light source that emits laser light;
   a collimator lens having a curved laser-light-exit-side lens surface and converting laser light emitted from the light source into parallel rays; and
   a lens holder that holds the collimator lens, the lens holder being formed of an elastically deformable material and having a cylindrical barrel portion and an aperture portion, fairing the laser light, integrally formed at one end of the barrel portion, the aperture portion being relatively thin to be deformable to follow the curved laser-light-exit-side lens surface of the collimator lens when pressed into contact with the lens, and the barrel portion being relatively thicker and less deformable than the aperture portion so that the barrel portion holds the collimator lens.

4. An image forming apparatus comprising an optical scanning device, the optical scanning device comprising:
   a light source that emits laser light;
   a collimator lens having a curved surface and converting laser light emitted from the light source into parallel rays; and
   an aperture member, that fairs the laser light, formed of an elastically deformable material and having a cylindrical barrel portion and an aperture portion integrally formed at one end of the barrel portion, the aperture portion being relatively thin to be deformable to follow the curved surface of the collimator lens when pressed into contact with the lens, and the barrel portion being relatively thicker and less deformable than the aperture portion so that the barrel portion holds the collimator lens.

* * * * *